(12) United States Patent
Wylezinski

(10) Patent No.: US 8,100,465 B2
(45) Date of Patent: Jan. 24, 2012

(54) TRAILER REAR DOOR FRAME WITH ANGLED REAR SILL

(75) Inventor: Andrzej Wylezinski, Lafayette, IN (US)

(73) Assignee: Wabash National, L.P.

( * ) Notice: Subject to any disclaimer, the term of this patent is extended or adjusted under 35 U.S.C. 154(b) by 648 days.

(21) Appl. No.: 11/846,100

(22) Filed: Aug. 28, 2007

(65) Prior Publication Data

US 2008/0073941 A1  Mar. 27, 2008

Related U.S. Application Data

(60) Provisional application No. 60/827,013, filed on Sep. 26, 2006.

(51) Int. Cl.
*B60N 3/00* (2006.01)
(52) U.S. Cl. .................................................. 296/209
(58) Field of Classification Search .................. 296/50, 296/51, 181, 181.3, 204, 209, 184.1; 293/102
See application file for complete search history.

(56) References Cited

U.S. PATENT DOCUMENTS

| | | | |
|---|---|---|---|
| 2,624,477 A | 1/1953 | Messick | |
| 2,889,059 A | 6/1959 | Selzer | |
| 2,979,214 A | 4/1961 | Selzer | |
| 3,032,214 A | 5/1962 | Brannan | |
| 3,172,549 A | 3/1965 | Novotney | |
| 3,175,706 A | 3/1965 | Mathers et al. | |
| 3,369,678 A * | 2/1968 | Robinson | 414/558 |
| 3,498,481 A | 3/1970 | Size | |
| 3,700,123 A | 10/1972 | Corley, Jr. | |
| 3,737,055 A * | 6/1973 | Pettit | 414/558 |
| 4,836,736 A | 6/1989 | Neagu | |
| 4,860,813 A * | 8/1989 | Ballyns et al. | 160/188 |
| 4,988,258 A * | 1/1991 | Lutz et al. | 414/500 |
| 5,704,676 A * | 1/1998 | Hill | 296/24.35 |
| 6,435,604 B2 | 8/2002 | Gaeta | |
| 6,652,010 B1 | 11/2003 | Huddle et al. | |
| 7,527,309 B2 * | 5/2009 | Smidler | 293/155 |
| 2001/0035667 A1 * | 11/2001 | Gaeta | 296/181 |
| 2005/0082850 A1 * | 4/2005 | Reierson et al. | 293/102 |
| 2005/0191161 A1 | 9/2005 | Ablabutyan et al. | |
| 2006/0138790 A1 * | 6/2006 | Okabe et al. | 293/102 |

OTHER PUBLICATIONS

Leyman Lift Gates Installation Manual LHLP-4500 Hide-A-Way Tuckunder Style brochure; Leyman Manufacturing Corporation; Twenty-Five (25) pages.
Leyman Lift Gates Installation Manual LHS & LLBS Hide-A-Way Tuckunder Style brochure; Leyman Manufacturing Corporation; Seventeen (17) pages.
Printout from www.leymanlift.com/documents/lhlp4500-5500.html of Leyman Lift Gates LHLP4500-5500 HIde-A-Way Tuckunder Style Lift Gate; Dated Sep. 9, 2006; Two (2) pages.

(Continued)

*Primary Examiner* — Charles A Fox

(57) ABSTRACT

A rear frame of a trailer has an elongated horizontal sill having a closed cross-section which is rigid in bending and in torsion. The elongated horizontal sill is formed of a fantail and a base plate attached to an underside of the fantail. The base plate has front and rear sections that are not notched as notching of the sill can weaken it. The front section is horizontal and the rear section is angled upwardly relative to the horizontal front section at a predetermined angle of approximately 22 degrees. The angling of the base plate provides a specialized geometry for accommodating a tuck-under lift gate. The sill also has minimal vertical dimensions to aid in the non-interference with legs of the tuck-under lift gate.

3 Claims, 9 Drawing Sheets

OTHER PUBLICATIONS

Maxon Lift Corp.; Operation Manual Tuk-A-Way Lift Gate Series GPT-25LM, GPT-3LM, GPT-4LM, GPT-5LM; Copyright 1997; Ten (10) pages.

Maxon Lift Corp.; Installation GPT Manual GPT-25, GPT-3, GPT-4, GPT-5; M-99-49 Rev. H Feb. 2004; Copyright 2004; Thirty-six (36) pages.

Maxon Lift Corp.; Maintenance GPT Manual GPT-25, GPT-3, GPT-4, GPT-5; M-97-15 Rev. G Jan. 2003; Copyright 2002; Forty-five (45) pages.

Maxon Lift Corp.; Operation GPT Manual GPT-25, GPT-3, GPT-4, GPT-5; M-97-16 Rev. F Jul. 2002; Copyright 2002; Twelve (12) pages.

Maxon Lift Corp.; Operation GPT Manual GPT-25, GPT-3, GPT-4, GPT-5; M-97-16 Rev. G Oct. 2005; Copyright 2005; Twelve (12) pages.

Maxon Lift Corp.; Installation GPT Manual GPT-25, GPT-3, GPT-4, GPT-5; M-99-49 Rev. K Oct. 2005; Copyright 2005; Thirty-seven (37) pages.

Maxon Lift Corp.; Maintenance GPT Manual GPT-25, GPT-3, GPT-4, GPT-5; M-97-15 Rev. H Oct. 2005; Copyright 2005; Forty-seven (47) pages.

Thieman Tailgates, Inc.; Stow Away Tailgates by Thieman; LRST-40 Owners Manual/Parts List; No date available; Fourteen (14) pages.

Thieman Tailgates, Inc.; Stow Away Tailgates by Thieman; LRST-40 Installation Instructions; No date available; Thirteen (13) pages.

* cited by examiner

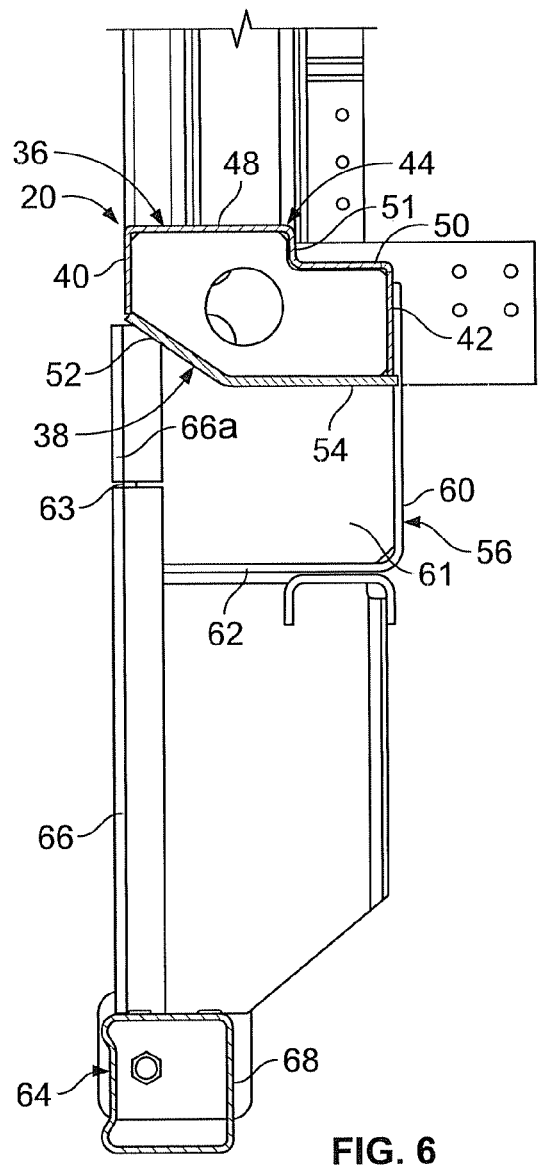
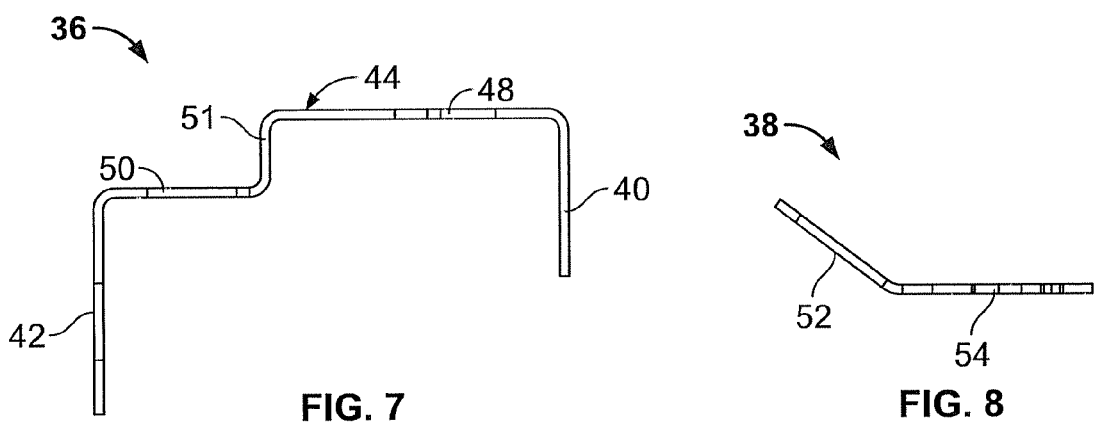
FIG. 6
FIG. 7
FIG. 8

TRAILER REAR DOOR FRAME WITH ANGLED REAR SILL

CROSS-REFERENCE AND INCORPORATION BY REFERENCE

This patent application claims the benefit of domestic priority of U.S. Provisional Application Ser. No. 60/827,013, filed Sep. 26, 2006, and entitled "Trailer Rear Door Frame With Angled Rear Sill". U.S. Provisional Application Ser. No. 60/827,013 is hereby incorporated by reference.

FIELD OF THE INVENTION

The present invention relates to rear door frames for trailers which are configured to have tuck-under lift gates installed. More specifically, the present invention relates to rear door frames for trailers which are capable of accommodating tuck-under lift gates without requiring any notching to the rear door frames.

BACKGROUND OF THE INVENTION

FIGS. 1-3 illustrate a prior art rear door frame 200 for a trailer. The rear frame 200 forms a rectangular opening into which the rear doors (not shown) are provided. The rear frame 200 includes an elongated horizontal sill 202, a pair of vertical posts 204 (only one of which is shown) that extend upwardly from the opposite ends of the sill 202, and an elongated horizontal top member (not shown). The posts 204 are connected to the sidewalls of the trailer by known means; the opposite ends of the sill 202 are connected to the baserails of the trailer by known means; and the opposite ends of the top member are connected to the top rails of the trailer by known means. A bumperette 205 is attached to the outer surface of each post 204.

The prior art sill 202 is formed from a fantail 206 and a flat base plate 208. The fantail 206 is formed as a channel and has a vertical rear wall 210, a vertical front wall 212 and a top wall 214 which connects the upper ends of the rear and front walls. The top wall 214 is formed of a rear wall portion 216 which is connected to the upper end of the rear wall 210, a front wall portion 218 which is connected to the upper end of the front wall 212, and a vertical wall 220 which connects the rear wall portion 216 to the front wall portion 218. The front wall portion 218 is stepped downwardly from the rear wall portion 216. This results in an open cross-section of the sill 202 which is rigid in bending, but not in torsion. In addition, the rear sill 202 is relatively large, having a vertical dimension along the rear wall 210 of 8.5 inches and a horizontal dimension along the top wall 214 of 8.19 inches.

The base plate 208 is attached to the bottom end of the rear wall 210 of the fantail 206, to the underside of each post 204 and to the underside of each bumperette 205. Along the rear of the trailer, the base plate 208 extends outwardly from the rear end of the fantail 206.

During assembly of the trailer in the manufacturing facility, a pair of bumper brackets 222 (only one of which is shown) are attached to the fantail 206 by welding. Each bracket 222 has a vertical front wall 224 which is attached to the front wall 212 at its upper end, and a horizontal bottom wall 226 extending from the bottom end of the front wall 224 toward the rear end of the trailer. A wall 228 closes the sides of the front and bottom walls 224, 226 and abuts against the rear wall 210. A notch 232 is formed in the wall 228 and the flat base plate 208 is seated within the notches 232.

During assembly of the trailer in the manufacturing facility, a standard bolt-on bumper 234 is attached to the bumper brackets 222. The bolt-on bumper 234 generally includes a pair of spaced apart vertical legs 236 (only one of which is shown) and a horizontal bumper 238 which is mounted to the lower ends of the legs 236. The legs 236 are attached to the bumper brackets 222.

The rear sill 202 of a trailer has to withstand large dynamic loads when a fork truck (e.g., with 24,000 lb front axle weight) enters the trailer at the dock, or when a trailer impacts a dock while backing up to the dock. These are large dynamic load that could potentially lead to fatigue cracking welded joints or even permanently bend the sill 202.

To attach a tuck-under lift gate, such as one sold by the Maxon or Leyman companies, the standard bolt-on bumper 234 and the bumper bracket 222 installed in the trailer manufacturing facility are removed, and the rear sill 202 is notched by the tuck-under lift gate installer to accommodate the legs of the lift gate in the raised position. A deck extension plate (not shown) may be attached to the rear wall 210 of the fantail 206 by suitable means, such as welding. The deck extension plate is relatively thin, generally ½ of an inch. The notching of the rear sill 202 to accommodate the tuck-under lift gate is undesirable as this may weaken the rear sill 202. Stress risers may form, thereby impacting the fatigue life, durability and safety of the sill 202. In addition, this requires additional time and effort to mount the tuck-under lift gate.

Thus, it is desirable to provide a trailer rear door frame that allows for installation of tuck-under lift gates from all major lift gate manufacturers in the United States without modification to the structure of the rear sill.

SUMMARY OF THE INVENTION

The invention provides a novel rear frame of a trailer. The rear frame has an elongated horizontal sill having a closed cross-section which is rigid in bending and in torsion. The elongated horizontal sill is formed of a fantail and a base plate attached to an underside of the fantail. The base plate has front and rear sections that are not notched as notching of the sill can weaken it. The front section is horizontal and the rear section is angled upwardly relative to the horizontal front section at a predetermined angle of approximately 22 degrees. The angling of the base plate provides a specialized geometry for accommodating a tuck-under lift gate. The sill also has minimal vertical dimensions to aid in the non-interference with legs of the tuck-under lift gate.

BRIEF DESCRIPTION OF THE DRAWINGS

The features of the invention which are believed to be novel are described in detail hereinbelow. The organization and manner of the structure and operation of the invention, together with further objects and advantages thereof, may best be understood by reference to the following description taken in connection with the accompanying drawings wherein like reference numerals identify like elements in which:

FIG. 6 is a cross-sectional side view of the rear door frame illustrated in FIG. 4;

FIG. 7 is a side view of a fantail forming part of a rear sill of the rear door frame;

FIG. 8 is a side view of a base plate forming part of the rear sill of the rear door frame;

DETAILED DESCRIPTION OF THE ILLUSTRATED EMBODIMENT

Figure 1:
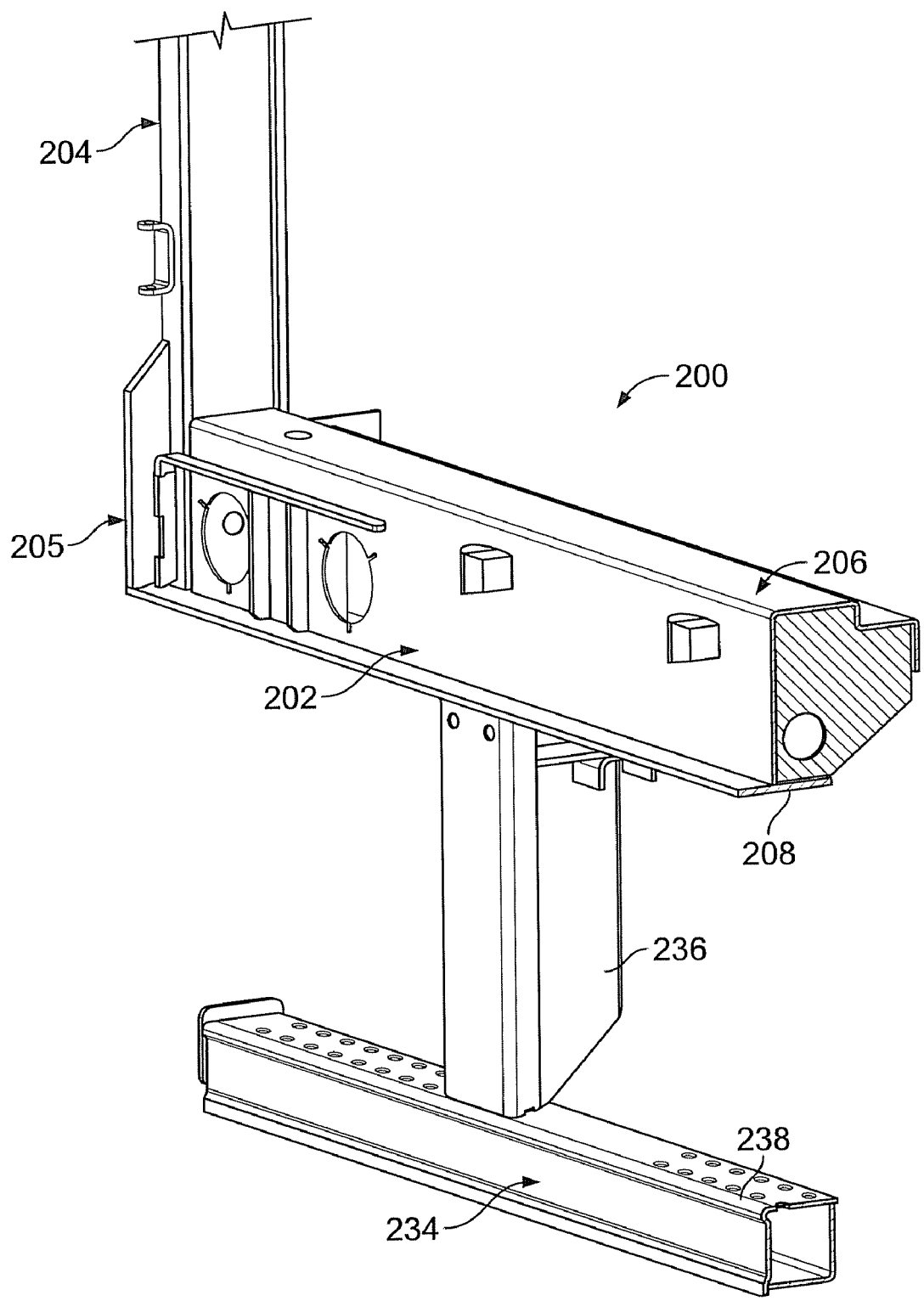
FIGS. 1-3 illustrate a prior art rear door frame for a trailer having a rear sill.
Figure 2:
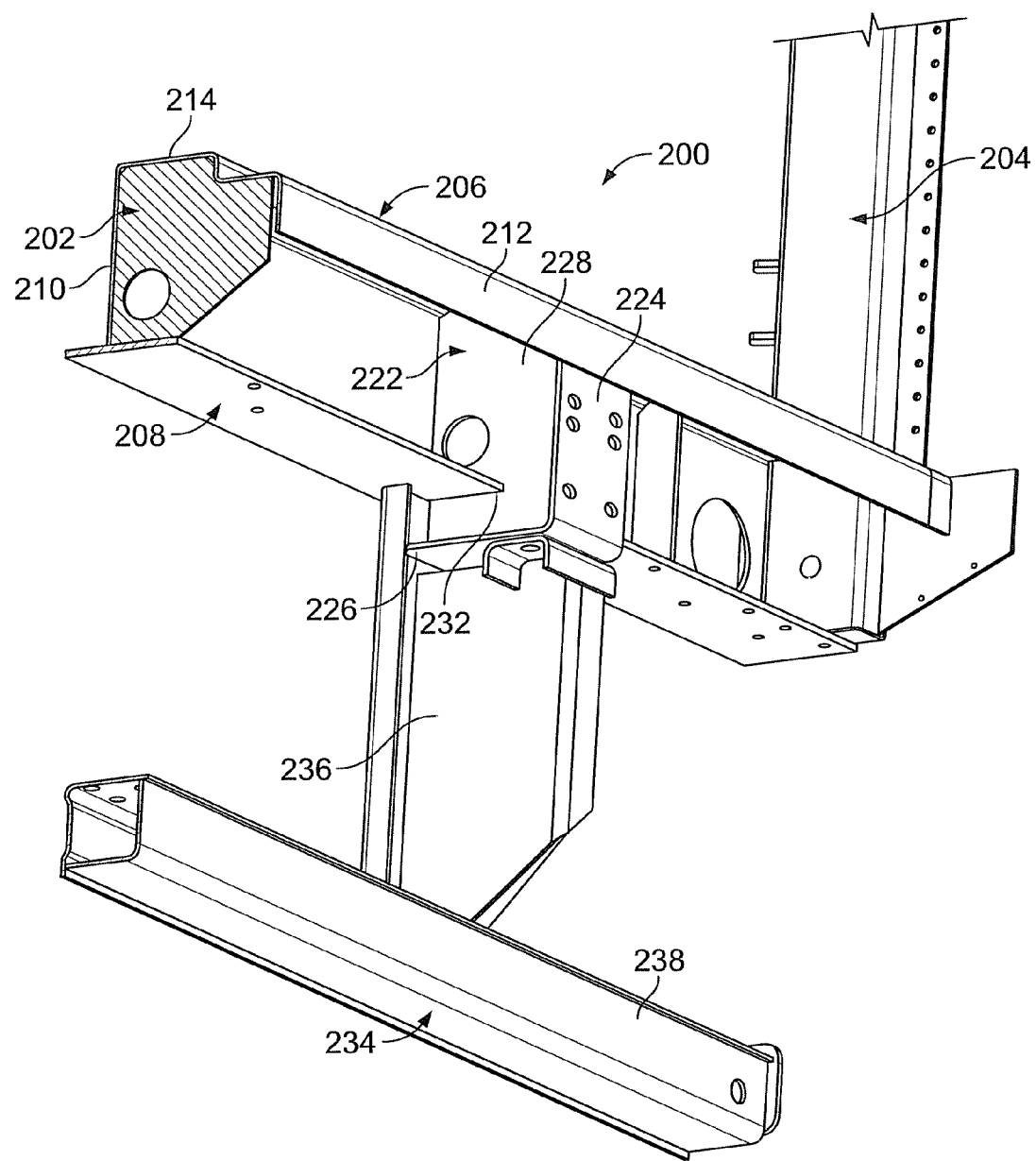
Figure 3:
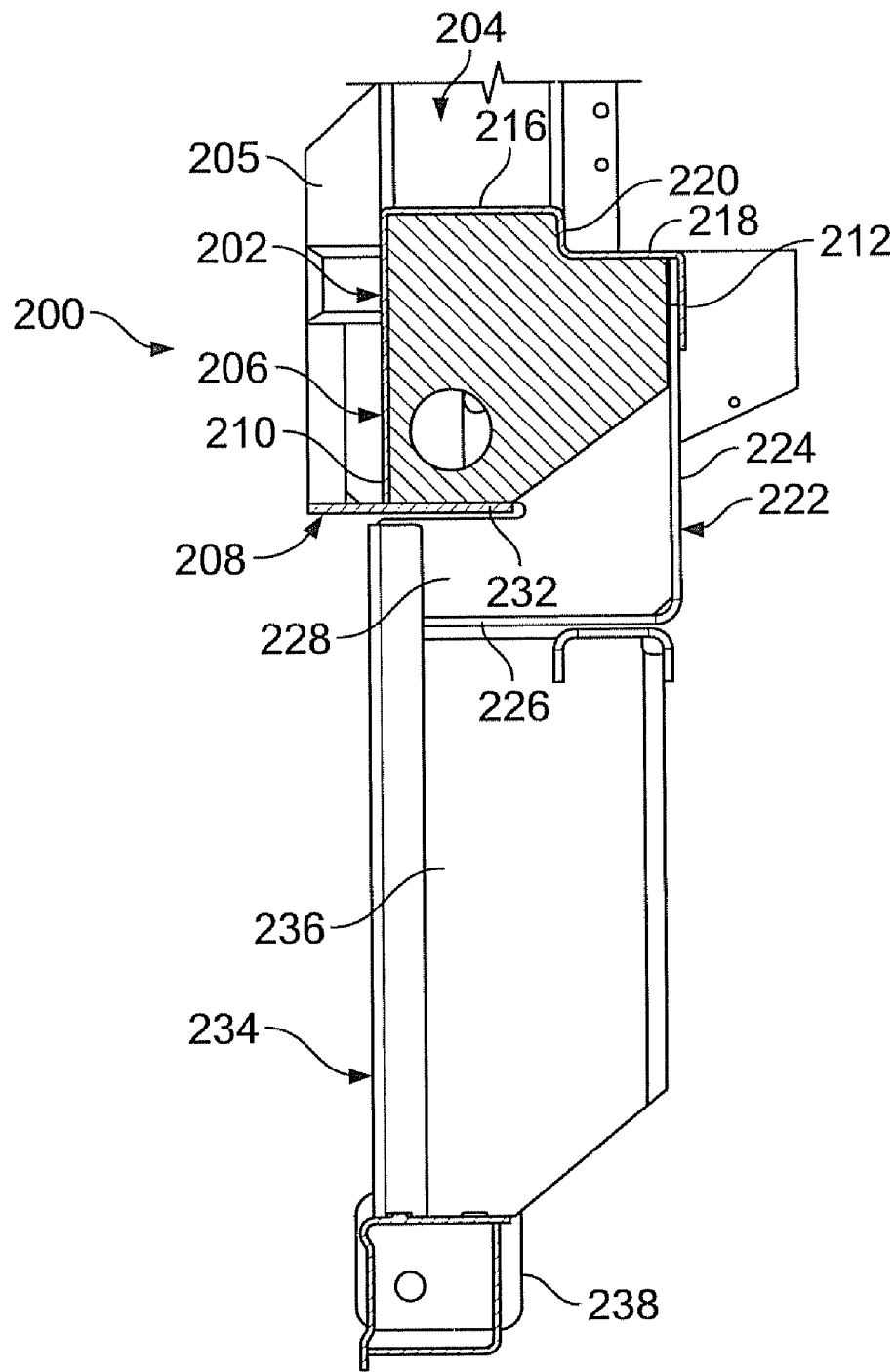
Figure 4:
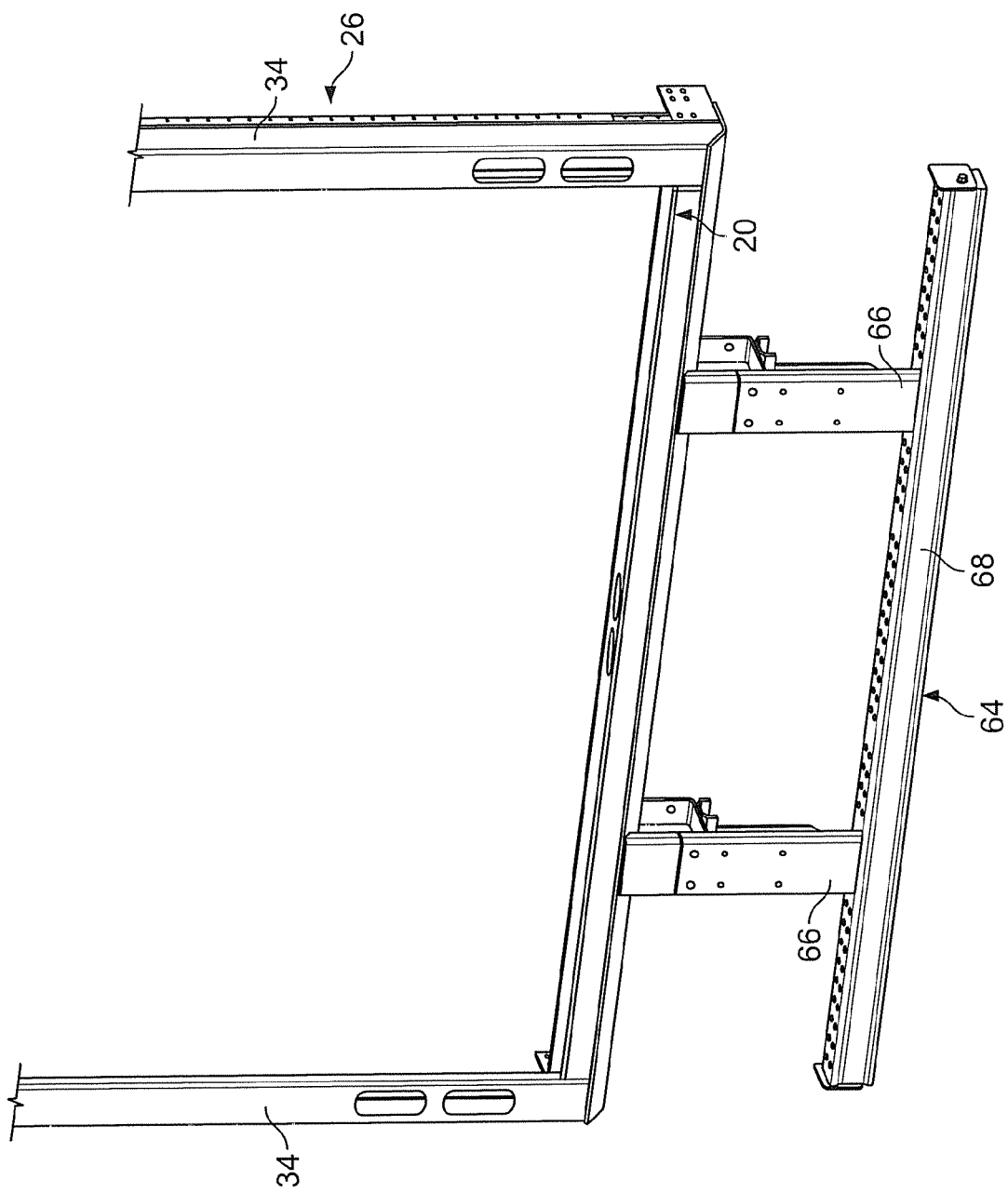
FIG. 4 is a perspective view of a rear door frame for a trailer incorporating features of an embodiment of the invention.
Figure 5:
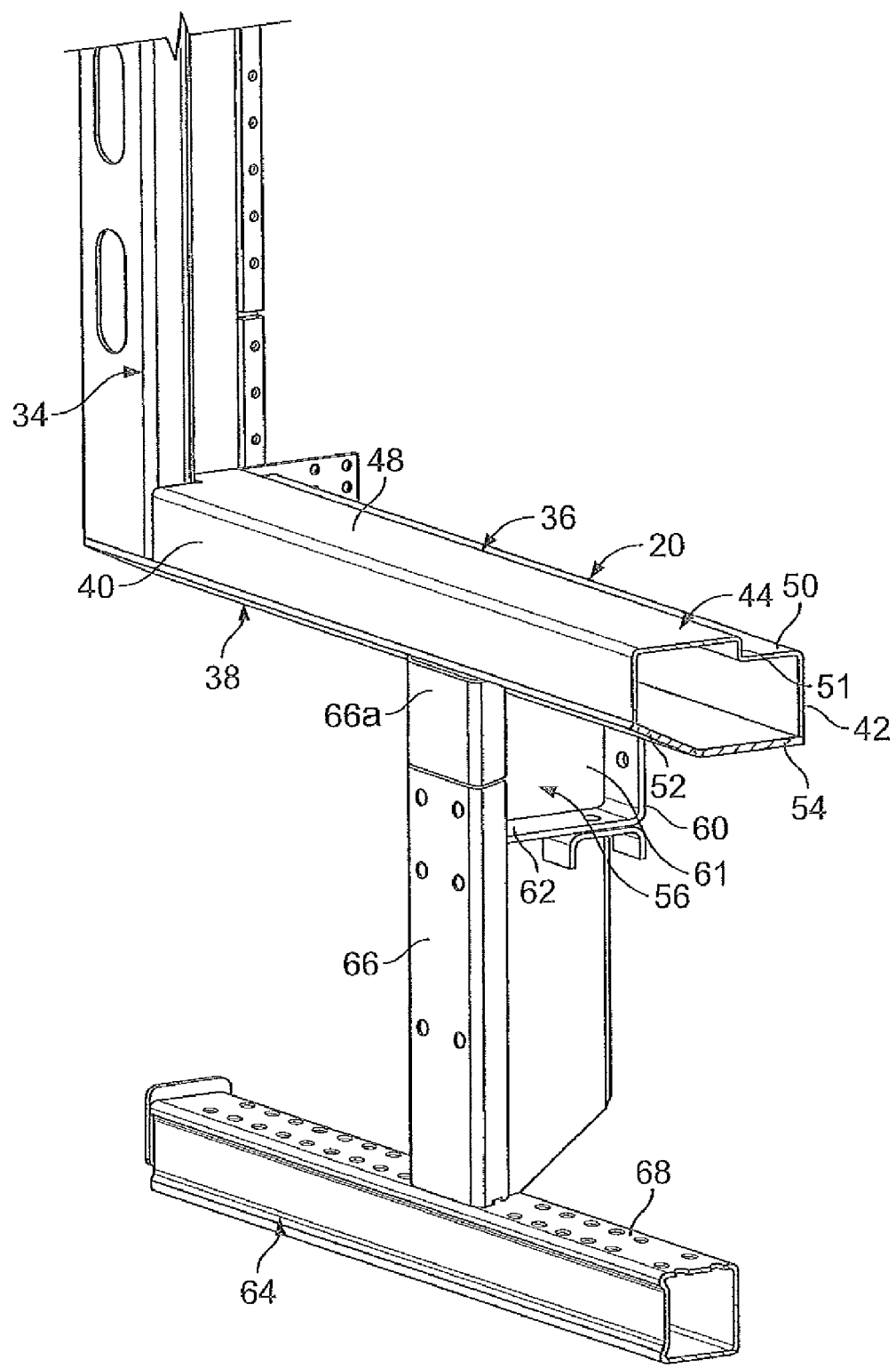
FIG. 5 is a partial perspective view of the rear door frame illustrated in FIG. 4.

While this invention may be susceptible to embodiment in different forms, there is shown in the drawings and will be described herein in detail, a specific embodiment with the understanding that the present disclosure is to be considered an exemplification of the principles of the invention, and is not intended to limit the invention to that as illustrated and described herein.

FIGS. 4-11 show a rear sill 20 provided for use on a rear end of a trailer, which incorporates features of the present invention. The rear sill 20 does not require modification, such as the notching that was done in the prior art, to allow for attachment of an associated tuck-under lift gate 22.

The trailer includes a body which is formed from a pair of sidewalls, a front wall, a rear frame 26 and the associated doors, a roof structure, and a floor structure 28. A pair of conventional slide rails 29 are attached beneath the floor structure 28 in a conventional manner. A conventional slidable rear undercarriage assembly is mounted in a conventional manner to the slide rails 29. A landing gear is secured underneath the front of the floor structure 28. The floor structure 28 and a lower portion of each sidewall are secured to a respective baserail which extends the length of the trailer. The baserails are preferably formed of aluminum, which may be extruded. The roof structure and an upper portion of each sidewall are secured to a respective top rail which extends the length of the trailer. The top rails are preferably formed of aluminum, which may be extruded. The trailer can be connected to a tractor by conventional means, such as a fifth wheel assembly, at its front end.

At the rear end of the trailer, the rear frame 26 forms a rectangular opening into which the rear doors (not shown) are provided. The rear frame 26 includes the elongated horizontal sill 20, a pair of vertical corner posts 34 that extend upwardly from the opposite ends of the sill 20, and an elongated horizontal top member (not shown). The posts 34 are connected to the respective sidewalls by known means; the opposite ends of the sill 20 are connected to the respective baserails by known means; the opposite ends of the top member are connected to the respective top rails by known means.

The sill 20 includes an elongated fantail 36 and an elongated base plate 38 attached to the underside of the fantail 36. The fantail 36 has a vertical rear wall 40, a vertical front wall 42, and a top wall 44 which connects the upper ends of the rear and front walls 40, 42. The bottom edges of the rear wall 40 and the front wall 42 are offset from each other, with the bottom edge of the rear wall 40 being vertically higher than the front wall 42. The top wall 44 is formed of a rear wall portion 48 which is connected to the upper end of the rear wall 40, a front wall portion 50 which is connected to the upper end of the front wall 42, and a vertical wall 51 which connects the rear wall portion 48 to the front wall portion 50. The front wall portion 50 is stepped downwardly from the rear wall portion 48.

The base plate 38 is formed from a rear section 52 and a front section 54. The rear and front sections 52, 54 are continuous such that they are not notched. The front section 54 is horizontal and the rear section 52 is angled upwardly relative to the horizontal front section 54 at a predetermined angle, preferably approximately 22 degrees. At its rear edge, the rear section 52 is attached to the bottom edge of the rear wall 40 of the fantail 36; at its forward edge, the front section 54 is attached to the bottom edge of the front wall 42 of the fantail 36. This results in a closed cross-section of the sill 20 which is rigid in bending and in torsion. In addition, the rear sill 20 is smaller than the prior art sill 202, having a vertical dimension along the front wall 42 of fantail 36 from the front section 54 of the base plate 38 to the rear wall portion 48 of the fantail 36 of approximately 5.25 inches and a horizontal dimension along the top wall 44 of approximately 7.75 inches.

During assembly of the trailer at the manufacturing facility, a pair of vertical bumper brackets 56 (only one of which is shown) are attached to the sill 20 and is welded thereto. Each bracket 56 has a vertical front wall 60 which is attached to the front surface of the front wall 42, and a horizontal bottom wall 62 extending from the bottom end of the front wall 60 toward the rear end of the bracket 56. A vertical flange wall 63 extends upwardly from the rear end of the horizontal bottom wall 62 and connects to the rear end of the rear section 52. A center wall 61 is positioned within the front wall 60, bottom walls 62 and the vertical flange wall 63.

During assembly of the trailer in the manufacturing facility, a standard bolt-on bumper 64 is attached to the bumper brackets 56. The bolt-on bumper 64 generally includes a pair of spaced apart vertical legs 66 and a horizontal bumper 68 which is mounted to the lower ends of the legs 66. The legs 66 are attached in a known manner to the bumper brackets 56. An extension 66a extends from the top end of the legs 66 and is connected with the angled rear section 52 of the base plate 38 and the vertical flange wall 63 of the bumper bracket 56 by welding. Extension 66a is part of the bumper bracket 56 and is pre-installed prior to the bolting-on of the bumper 64.

Figure 9:
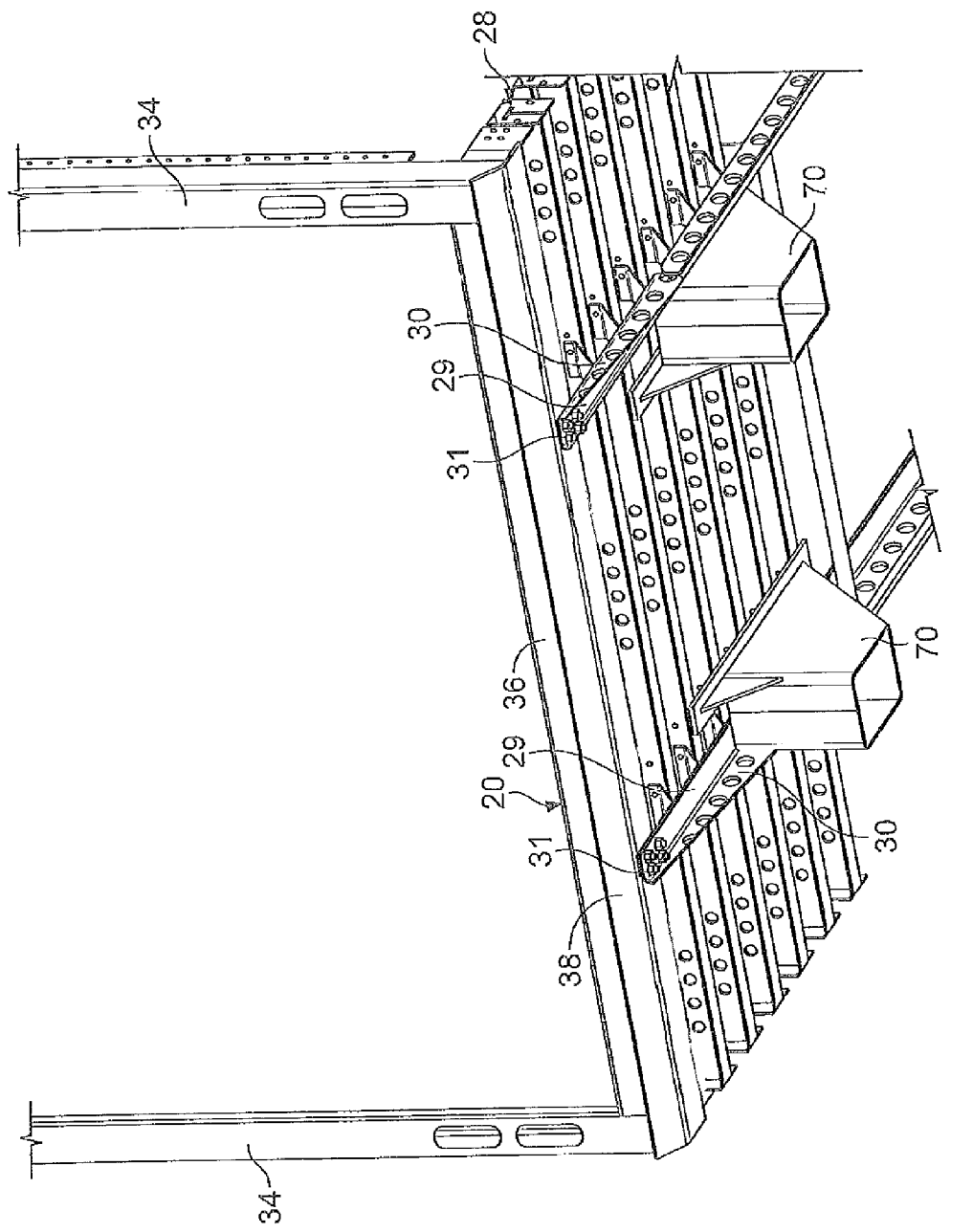
FIG. 9 is a perspective view of a portion of a trailer illustrating the rear door frame and the rear underside of the trailer.
Figure 10:
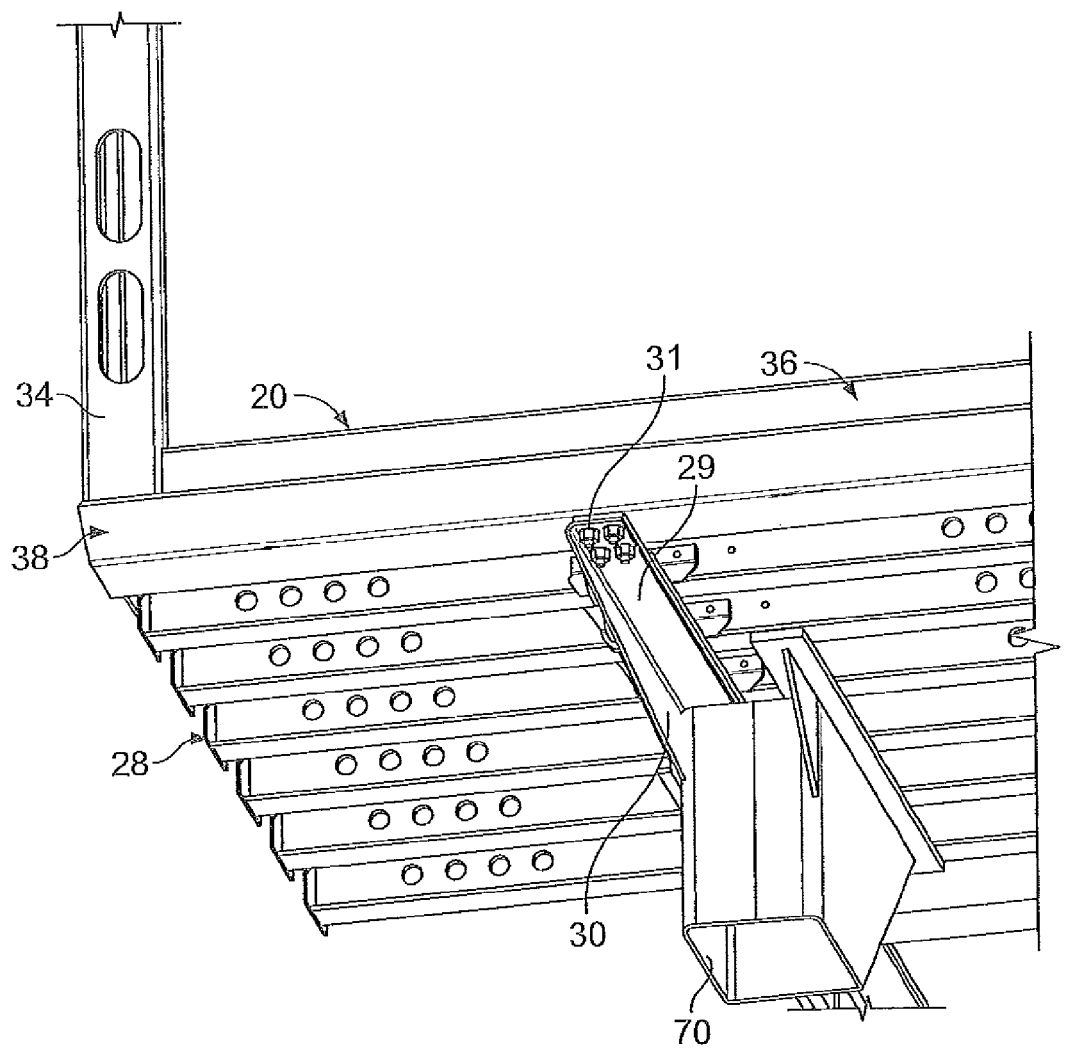
FIG. 10 is an enlarged perspective view of a portion of the rear door frame and rear underside of the trailer illustrated in FIG. 9.
Figure 11:
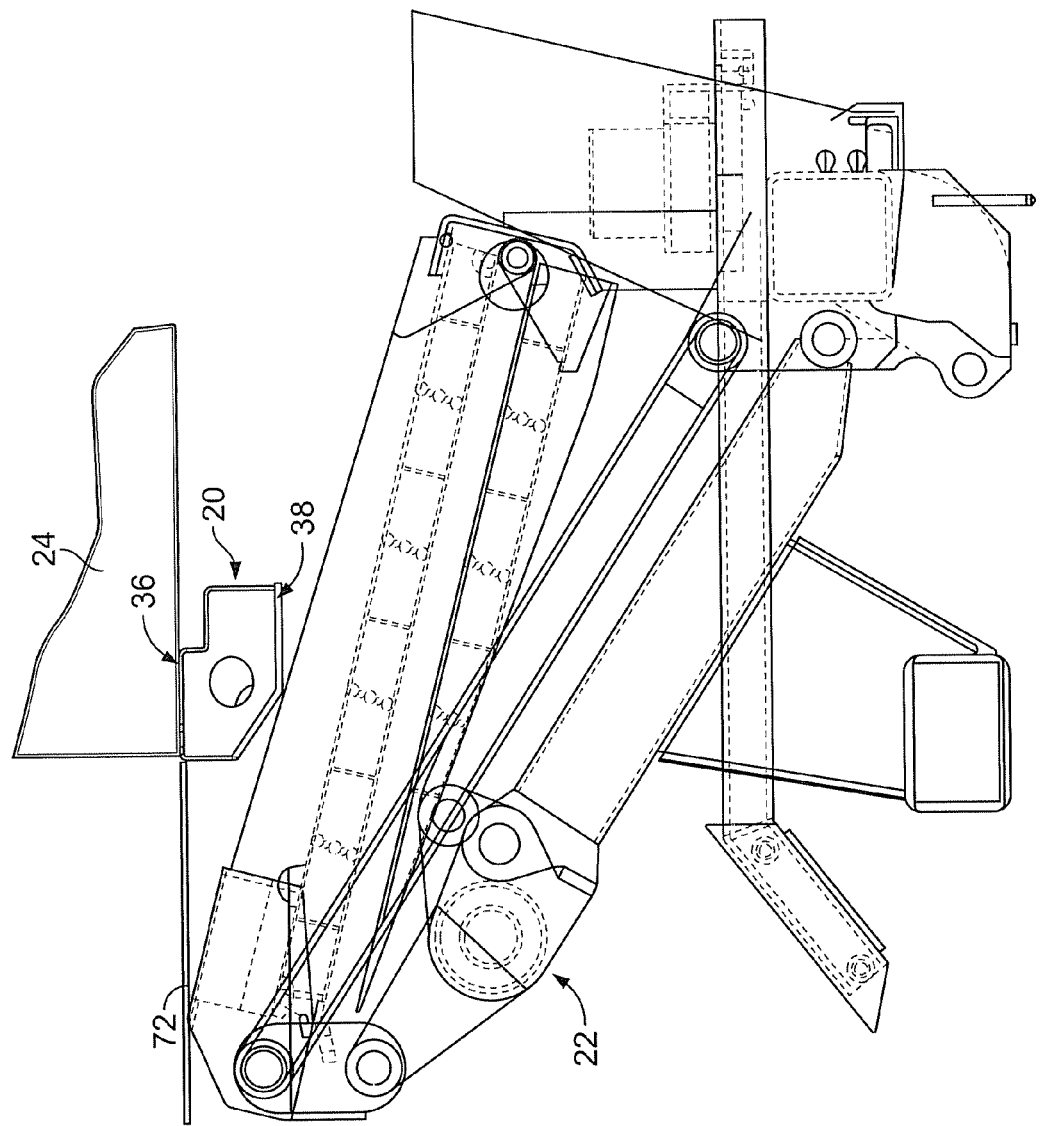
FIG. 11 is a side view illustrating the relative positioning of a tuck-under lift gate relative to the rear sill of the rear door frame of a trailer.

As shown in FIGS. 9 and 10, to attach the tuck-under lift gate 22, such as one sold by the Maxon or Leyman companies, the standard bolt-on bumper 64 and the bumper bracket 56 installed in the manufacturing facility are removed by the third party lift gate installer. The slide rails 29 are then tapered at their rear ends. In addition, extension angles 30 are welded to the slide rails 29 and to the rear sill 20. A support member 70 is attached to each slide rail 29 in a known manner. A deck extension plate 72 may be attached, if required, to the rear wall 40 of the fantail 36 by suitable means, such as welding. The deck extension plate 72 is relatively thin, generally approximately ½ of an inch (0.5 inches).

Thereafter, the tuck-under lift gate 22 is attached in known manner to the support members 70. Because the sill 20 has an angled base plate 38, this provides a specialized geometry for accommodating the tuck-under lift gate 22 and a result, the base plate 38 is continuous and does not need to be notched to accommodate the legs of the tuck-under lift gate 22. This improves the structural integrity of the sill 20 over prior art notched sills 202, by removing stress risers thereby improving its fatigue life, durability and safety. The lesser dimensional height of the base plate 38 than prior art base plates aids in the non-interference with the legs of the tuck-under lift gate 22. Thus, the sill 20 accommodates tuck-under lift gates from all major manufacturers in the United States, without modification of the structure of the sill 20.

Alternatively, the trailer manufacturer can install the tuck-under lift gate 22 in its manufacturing facility. In this situation, the bolt-on bumper 64 and the bumper brackets 56 are never installed and instead, the trailer is prepared for installation the tuck-under lift gate 22. To do so, the manufacturer installs the slide rails 29 in a conventional manner, then installs the extension angles 30 which have pre-tapered rear ends. The extension angles 30 are welded to the slide rails 29. The extension angles 30 have a tapered end proximate to the rear sill 20 and is bolted to the rear sill 20 via bolts 31. The rear sill 20 can contain pre-installed nuts (not shown) into which the bolts 31 are threaded. A support member 70 is attached to each slide rail 29 in a known manner. A deck extension plate 72 may be attached, if required, to the rear wall 40 of the fantail 36 by suitable means, such as welding. The deck extension plate 72 is relatively thin, generally ½ of an inch. Thereafter, the tuck-under lift gate 22 is attached in known manner to the support members 70.

While a preferred embodiment of the present invention is shown and described, it is envisioned that those skilled in the art may devise various modifications of the present invention without departing from the spirit and scope of the appended claims.

The invention is claimed as follows:

1. A rear sill of a trailer comprising:
an elongated horizontal fantail; and
an elongated base plate attached to an underside of said fantail, said base plate having continuous front and rear sections said front section being horizontal and said rear section being angled upwardly relative to said horizontal front section at a predetermined angle,
wherein the fantail includes a vertical wall positioned between and coupled to a horizontal rear wall portion and a horizontal front wall portion of the fantail.

2. A rear sill of a trailer comprising:
an elongated horizontal fantail; and
an elongated base plate attached to an underside of said fantail, said base plate having continuous front and rear sections, said front section being horizontal and said rear section being angled upwardly relative to said horizontal front section at a predetermined angle,
wherein said fantail has a vertical rear wall having an upper end and a bottom edge, a vertical front wall having an upper end and a bottom edge, and a top wall which connects said upper ends of said rear and front walls, said bottom edges of said rear and front walls are offset from one another with said bottom edge of said rear wall being vertically higher than said bottom edge of said front wall, and
wherein the front section of the base plate is longer than the vertical front wall of the fantail.

3. A rear sill of a trailer comprising:
an elongated horizontal fantail; and
an elongated base plate attached to an underside of said fantail, said base plate having continuous front and rear sections, said front section being horizontal and said rear section being angled upwardly relative to said horizontal front section at a predetermined angle,
wherein said fantail has a vertical rear wall having an upper end and a bottom edge, a vertical front wall having an upper end and a bottom edge, and a top wall which connects said upper ends of said rear and front walls, said bottom edges of said rear and front walls are offset from one another with said bottom edge of said rear wall being vertically higher than said bottom edge of said front wall, and
wherein a horizontal distance between the front and rear vertical walls of the fantail is less than a vertical distance between the front section of the base plate and the rear wall portion of the top wall of the fantail.

\* \* \* \* \*